(12) United States Patent
Mueller et al.

(10) Patent No.: US 8,238,885 B2
(45) Date of Patent: Aug. 7, 2012

(54) SYSTEM AND METHOD FOR IMAGE AND DATA UPLOAD BY MEANS OF A TERMINAL

(75) Inventors: Frank Mueller, Aachen (DE); Mario Joussen, Nideggen-Wollersheim (DE)

(73) Assignee: NeoMedia Europe GmbH, Wurselen (DE)

( * ) Notice: Subject to any disclaimer, the term of this patent is extended or adjusted under 35 U.S.C. 154(b) by 642 days.

(21) Appl. No.: 12/227,878

(22) PCT Filed: May 29, 2007

(86) PCT No.: PCT/DE2007/000964
§ 371 (c)(1),
(2), (4) Date: Dec. 18, 2008

(87) PCT Pub. No.: WO2007/140745
PCT Pub. Date: Dec. 13, 2007

(65) Prior Publication Data
US 2009/0291671 A1 Nov. 26, 2009

(30) Foreign Application Priority Data

Jun. 2, 2006 (DE) .......................... 10 2006 026 252
Oct. 20, 2006 (DE) .......................... 10 2006 050 409

(51) Int. Cl.
*H04M 3/42* (2006.01)

(52) U.S. Cl. .................. 455/414.1; 455/414.2; 455/305; 455/414.4; 382/165

(58) Field of Classification Search ............... 455/414.1, 455/414.2, 414.3, 414.4; 382/165, 305
See application file for complete search history.

(56) References Cited

U.S. PATENT DOCUMENTS

| 7,639,943 | B1 * | 12/2009 | Kalajan ........................ 396/429 |
| 2002/0143860 | A1 | 10/2002 | Catan | |
| 2006/0002607 | A1 | 1/2006 | Boncyk et al. | |
| 2006/0094411 | A1 * | 5/2006 | Dupont ......................... 455/417 |
| 2007/0130190 | A1 | 6/2007 | Yoshikawa | |

FOREIGN PATENT DOCUMENTS

| DE | 10 2005 010 146 | 4/2006 |
| GB | 2 368 181 | 4/2002 |
| WO | WO 01/05047 | 1/2001 |
| WO | WO 01/88833 | 11/2001 |
| WO | WO 2005/062186 | 7/2005 |

* cited by examiner

*Primary Examiner* — Kamran Afshar
*Assistant Examiner* — Sayed T Zewari
(74) *Attorney, Agent, or Firm* — Barkume & Associates, P.C.

(57) ABSTRACT

In order to avoid erroneous or incorrectly attributed comments in picture-assisted documentation systems, the invention proposes a system which comprises at least one mobile terminal, at least one server and at least two machine-readable markers applied to or on articles, in which the mobile terminal comprises a reading unit which can be used to read the markers applied to or on the articles, a camera for taking pictures, and means for sending pictures.

16 Claims, 4 Drawing Sheets

SYSTEM AND METHOD FOR IMAGE AND DATA UPLOAD BY MEANS OF A TERMINAL

CROSS REFERENCE TO RELATED APPLICATIONS

This application is the National Stage of PCT/DE2007/000964 filed on May 29, 2007, which claims priority under 35 U.S.C. §119 of German Application No. 10 2006 026 252.2 filed on Jun. 2, 2006 and German Application No. 10 2006 050 409.7 filed Oct. 20, 2006. The international application under PCT article 21(2) was not published in English.

BACKGROUND OF THE INVENTION

1. Field of the Invention

The invention relates to the upload of image information together with the upload of data (comments) associated with this image information from a mobile terminal (in particular a mobile telephone) to a remote server.

2. The Prior Art

It is known that it is possible to record images with standard camera cell phones and to send them to another mobile telephone together with a message, e.g., as a multimedia message (MMS). It is also known that images can be recorded with digital cameras and that these images can be transferred to a PC together with comments (such as, e.g., date of recording and time).

In such systems and methods, the comments are frequently incorrect and/or incorrectly assigned to the images. If, for example, calendar and clock of the camera are set incorrectly, the images are stored with incorrect date and time information. Likewise, a simple incorrect input can lead to an incorrect comment, which is no longer detected subsequently.

SUMMARY OF THE INVENTION

It is thus the object of the invention to provide a system and a method, by means of which images together with corresponding comments can be uploaded from a mobile terminal to a remote server, where incorrect or incorrectly assigned comments are avoided. This is particularly important for image-supported documentation systems, the quality of which fundamentally depends on the fact that images and comments match one another and that the information included in the comments is reliable.

According to the device, the object is solved by means of a system, which comprises at least one mobile terminal, at least one server and at least two machine-readable markers (e.g. bar code symbols or RFID tags), which are mounted to or on articles and which include different content, where the terminal is at least intermittently in contact with the server and communicates with said server; and where the mobile terminal comprises a reader as means for reading machine-readable markers, by means of which the markers mounted to or on the articles can be read, a camera for recording images as well as means for transferring images.

Due to the fact that the mobile terminal is at least intermittently in contact with a server and due to the fact that server and terminal communicate with one another, it is made possible, for example, to match date and time of the terminal to the server and to set the clock of the terminal in a remote-controlled manner, respectively.

It is particularly advantageous when the data content of the machine-readable markers, which are mounted to or on the articles, is associated with the articles. Due to the fact that the markers mounted to or on the articles can be read by the mobile terminal, it becomes possible to import information relating to these articles into the mobile terminal in an automated manner and to further use the information. Due to the fact that the markers differ with regard to their content, it becomes possible, in particular, to clearly identify the articles.

In terms of the invention, the term "mobile terminal" comprises all of the easily movable devices, which are suitable for a data recording and for data playback. Preferably, at least portions of the recorded data can be used at the mobile terminal by means of these mobile terminals or they can at least be buffered in the mobile terminal. If they can be buffered in the mobile terminal, they can preferably be transferred to another device, such as, e.g., a PC or a laptop and can be used at this device cumulatively or alternatively to the mobile terminal. The focus is hereby on mobile communication devices, in particular mobile telephones. However, PDAs or other hand-held terminals are also captured by the term "mobile terminal". In terms of the invention, the term "machine-readable markers" refers to articles, in which data are embedded according to a predefined symbology and which can be read out by means of corresponding readers. Symbols, such as characters, bar codes or matrix codes, for example, which are imprinted on any substrates or which are illustrated in another way, thus represent machine-readable markers in terms of the invention, due to the fact that the information associated with these symbols can be determined by means of correspondingly programmed optical readers. It goes without saying that symbols, which are illustrated on electronically changeable displays, e.g. LCD screens, also represent machine-readable markers in terms of the invention. Likewise, it goes without saying that symbols or lettering, such as logos, which are designed in a special form, represent machine-readable markers in terms of the invention even if they are not associated with any further information, except for the information of being a special symbol, which can clearly be differentiated from other symbols.

Likewise, electromagnetically readable data carriers, such as contactless smartcards, NFC chips or RFID labels, are understood as machine-readable markers in terms of the invention, due to the fact that the data are also embedded herein according to a predefined symbology and can be read out by means of adequately programmed readers.

In this case, the symbology also determines the special physical method of reading out the machine-readable markers, such as frequency and modulation of the excitation and response signals, for example.

Presently, a "reader" is each device, which is capable of identifying the presence of machine-readable markers in terms of the invention in the proximity of the reader and to extract data and information, respectively, embedded in the machine-readable markers. In terms of the invention, the reader is preprogrammed in such a manner that the reader can identify machine-readable markers of certain symbologies. Ideally, the reader can be updated, whereby it is subsequently sensitized for new machine-readable markers, which are to be recognized and which correspond to further symbologies.

It is advantageous when the mobile terminal encompasses a reader, which encompasses a decoder for decoding information embedded in image data, due to the fact that the information, such as characters, bar codes or matrix codes, which is embedded in such a reader, can be identified and used by means of such a reader.

It is advantageous when the mobile terminal encompasses a reader, which encompasses a receiver for electric, magnetic and/or electromagnetic fields, due to the fact that the information, which is embedded in machine-readable markers, which act electrically, magnetically and/or electromagnetically, can be identified and used.

It is particularly advantageous in this context when the mobile terminal encompasses a reader for contactless smartcards, NFC modules and/or RFID labels, due to the fact that the information embedded in such machine-readable markers can be identified and used therewith.

In terms of the invention, a "server" can be realized as a single computer comprising corresponding software and a wireless interface, e.g., in a GSM or UMTS mobile communications network. However, it is equally possible (and preferred in practice) that the system, which is identified as a server in terms of the invention, is actually assembled from a plurality of computers, which are connected via a network (e.g. internet).

It is advantageous when the system comprises a sequence control, due to the fact that the reading of markers, the recording and the transfer of images can be controlled and coordinated therewith. Such a sequence control can run on the terminal as a program and is then advantageously connected to the means for the automatic identification and to the means for recording images. However, it can also be implemented on the server and can control and monitor, respectively, the flow on the mobile terminal from afar.

According to the method, the object is solved by means of a method, where at least one machine-readable marker is read out, at least one image is recorded, said recorded image is transferred to a remote server, data are transferred to a remote server, said data correlating with the data included in the machine-readable marker, and where a comment is generated by means of these data, and said comment is linked with the image, which is transferred to the server.

It is advantageous when the transfer of the image and of the data is carried out wirelessly, due to the fact that a transfer in real time is thus ensured to a large extent independent on the location of the image recording and the reading of the marker.

The implementation on the part of the mobile terminal proves to be particularly simple when the data, which are transferred to the remote server, are assigned in a particularly simple manner with the data included in the marker, in particular when they include a portion of the data, which is included in the marker.

A system, by means of which the mounting of printed advertising media (bills) on advertising media (e.g. billboards), which will hereinbelow be referred to in short as "billposting", is supported and where billboardings are documented in a simple and user-friendly manner, will be described below as an example for an advantageous embodiment of the invention. The system supports, in particular, the work of the bill poster by means of an online transfer of the orders; and due to the real-time and consistent documentation of the billboardings, which is made possible by means of the invention, the external advertiser can monitor the quality of the billboardings and can set up a modern quality management system.

An important component of this system is an ERP system, by means of which the billboarding orders from the customers of the external advertiser can be taken care of, among other things, and by means of which orders are assembled for the bill posters. According to the invention, said ERP system is expanded by an image-supported documentation system comprising a database as well as by at least one concentrator module for the wireless communication with mobile terminals. This ERP system, which is expanded in such a manner, will be referred to hereinbelow as "billboarding background system". In a preferred embodiment, the concentrator module has a GSM modem or an UMTS modem (or is connected therewith via a network), due to the fact that a data communication between the billboarding background system and standard mobile telephones is thus possible in a simple manner.

The mobile terminals, which bill posters carry along and use in the context of the system, represent a further important component of the system. These mobile terminals include a camera, communication means for communicating with the billboarding background system and at least one reader for reading machine-readable markers. In a preferred embodiment, standard camera mobile telephones, which are equipped with a special software program, which is designed according to the invention, are used for this purpose. This software program will be referred to hereinbelow as client application. It is particularly advantageous when the reader is suitable for reading optical markers (e.g. data matrix symbols), due to the fact that these can be printed on the bills in a simple and cost-efficient manner. In this context, it is furthermore advantageous when the reader uses the camera which is available in the terminal for recording the marker, due to the fact that additional hardware costs are not incurred by doing so.

Machine-readable markers ("location code markers") are mounted on billboards, which belong to the system and which can be read out by the bill poster by means of their terminals. The location code markers mounted on different locations and on different billboards, respectively, differ in their data content so that the content of a location code marker clearly identifies the location. In an embodiment, the location code markers are embodied as data matrix code symbols. In a further embodiment, the location code markers are embodied as RFID labels. It goes without saying that in this case the terminals are equipped with RFID readers, so that the location code markers can be read by the terminals. The content of a location code marker will be referred to hereinbelow as "location code".

Alternatively or cumulatively to this location code, information relating to the current position of a mobile telephone can also be queried by means of localization functions of a network operator and can be transferred to the server. For example, the mobile telephone can transfer the number of the base station, with which it is in radio contact, to the server.

Also alternatively or cumulatively to the location code, information relating to a position of a mobile telephone can also be queried by means of a positioning function of the mobile telephone and can be transferred to the server. For example, a mobile telephone can transfer geographic coordinates to the server by means of a GPS receiver.

The bills are also provided with machine-readable markers ("motif code markers"), which can be read by the bill posters by means of their terminals. It is advantageous when these markers are embodied in printed form, thus for example as data matrix symbol, due to the fact that such an embodiment only causes negligible costs. This code will be referred to hereinbelow as motif code. The data content of motif code markers, which are mounted on different bills, in particular on bills comprising different motifs, differs so that the content of the motif code markers clearly identifies the bill motif. The content of a motif code marker will be referred to hereinbelow as "motif code".

From the point of view of a bill poster, a possible procedure presents itself as follows. Initially, the bill poster initiates the client application on his mobile telephone and logs into the bill posting background system by means of said mobile telephone. After a successful log-in and after a possible system check (e.g. time check and/or resetting the system clock in the mobile telephone) as well as after a possible update of the client application, the bill poster obtains a list of open bill posting orders, which he can complete subsequently. It is particularly advantageous thereby when a complete tour is arranged individually for the bill poster, due to the fact that the bill poster then does not need to take over a route planning himself and detours can be avoided to a large extent.

It is also advantageous in this context when directions and/or further route information (e.g. relating to traffic jams, construction sites, detours, areas for pulling over) are transferred to the bill poster via the client application.

It goes without saying that additional bill posters can use their cell phone and their client applications, respectively, to log into and out of the background system at any time and completely independent on the other bill posters. A plurality of bill posters, in particular, can be logged into the background system at the same time.

The bill poster drives to the location of his first order of his tour. He checks the order details, which were transferred to him by the bill posting background system to the client application, and carries out the indicated order.

In case he is unsure whether or not he is at the right location (that is, the location code marker that matches the order), he scans the location code marker, which is mounted to the billboard, and obtains a corresponding response from the client application. This has the advantage that the bill poster can avoid a misposting ahead of time.

It is also possible that a bill poster wants to process individual positions of the selected tour in a different order because of his special knowledge of the area. In this case, the bill poster can also scan the location code at the billboard, whereupon the background system supplies the bill poster with order information relating to this location.

In a normal case, an order will include the mounting of a bill or a plurality of bills to a billboard, wherein the client application informs the bill poster about the respective motifs, which are to be used.

The bill poster can scan the motif code markers located on the bill and receives a corresponding response from the client application as to whether this is the motif, which matches the order. For the case that the bill poster is not sure whether he has chosen the correct bill motif, the bill poster can avoid a misposting ahead of time.

In addition to the motif, which is to be used, the bill poster can be instructed to use a certain bill posting method, for example.

It is also possible that it is not a new bill motif, which is to be mounted, but that an existing bill is to be maintained instead and that the bill poster only receives an order relating to the documentation of the condition of the existing bill posting and/or relating to the billboard. A maintenance bill posting or a repair bill posting can also be ordered, where the bill motif is maintained, but an at least partially new bill posting is required to even out natural wear and/or to repair damages (for example due to weather influences or vandalism).

The bill poster carries out the order, which, in these cases, means that he chooses a bill with the motif, which is displayed on the mobile telephone and which matches the respective billboard, and he mounts said bill to the billboard.

To document the correct completion of the bill posting order, the bill posters scans the location code marker as well as the motif code marker.

The client application then places the mobile telephone into an image recording mode and asks the bill poster to use the camera to record an image of the performed work. This image comprising the corresponding order data, including a log-in name of the bill poster with location code and motif code as well as date and time, is transferred to the bill posting background system.

The client application thereby checks whether location code and motif code match one another and match the order and provides a corresponding response to the bill poster in case of an error and provides possibilities for corrections.

Likewise, the client application holds the image recording mode active only for a certain time and warns the bill poster when the recording does not take place promptly with the reading of the location code and the motif code.

When a transfer of the image together with the corresponding data (order data, log-in name, location code, motif code, date, time) to the bill posting background system is not possible, the image and the data are buffered on the mobile telephone and are transferred later as soon as better transfer conditions enable the upload to the background system again. This may be the case, for example, with bill posting orders in subway stations, where a good mobile communications coverage is not available. It is advantageous hereby when the time stamps of the image recording and of the reading of the codes are transferred due to the fact that this time information can deviate highly from the time of the transfer.

It may also occur that a bill poster is prevented from carrying out an order due to the fact that external circumstances do not allow for a bill posting. For example, billboards may not be accessible at times (blocked in, construction site) or may be destroyed (storm damage, vandalism). In this case, the bill poster can transfer a corresponding message with a documenting photo to the background system via his client application. This is advantageous in particular due to the fact that the background system is capable of determining a new location for the motif, which is to be mounted, without time delay and to thus immediately generate a new further order, which is then carried out by one of the bill posters in the near future.

A documentation system, by means of which the condition of rental cars can be documented in a simple and user-friendly manner, will be described below as a further example for an advantageous embodiment of the invention.

When returning a rental car, the condition of the returned car is determined by means of an examination and is documented in a documentation system, which also includes a database.

The documentation is carried out by an employee of the car rental company in the parking space of the returned car by means of a correspondingly programmed camera cell phone (smart phone). Among other things, the smart phone is programmed in such a manner that it can read license plates recorded by means of the cell phone camera.

Upon the return of the rental car, the employee of the car rental company initiates the program on the cellular phone, which connects to the documentation system via the mobile communications network in the parking space. The employee then uses the cellular phone to read the license plate of the rental car, whereupon the content of the license plate is transferred to the documentation system.

The employee then receives on his cellular phone a screen form, which is pre-filled to correspond to the corresponding rental car. In particular, this form includes information relating to small damages, which have not yet been repaired (e.g. scratches), which were already present prior to the rental to the last customer. When images relating to these damages are available in the database, the employee can look at them on his cellular phone and can compare them with the returned car directly on site.

If the employee determines damages, he can record these damages with the cellular phone and can transfer them directly to the documentation system via GPRS. Due to the fact that the license plate of the rental car had already been scanned previously, the license plate can be transferred automatically by the cellular phone program together with the image without requiring the bill poster to manually input the license plate of the rental car. Incorrect assignments in the database caused by incorrect inputs are thus avoided.

The object of the instant invention lies in providing a method for transferring information, in particular of image data, where a plurality of images is recorded. According to a first aspect of the invention, a portion of these images is linked as an image sequence as a function of the time they were recorded. Cumulatively or alternatively, provision is made for at least a portion of the images to be fed to an image identification method and that it is linked as an image sequence as a function of the identified image type. Furthermore, it is proposed alternatively or cumulatively that at least a portion of the images is transferred and that it is linked as an image sequence at the receiver, as a function of the sender.

A special image sequence is thus compiled as a function of the time of the recording, the image type and/or the sender. This compilation can be carried out directly at the image recording device or after the transfer of the images in an image processing device, which is connected downstream from the transfer. Furthermore, some images can be fed to an image identification method directly in response to the image recording and other images can only be fed after the transfer.

The invention also includes a billboard comprising a machine-readable marker. Preferably, the billboard encompasses a bill, which also encompasses a machine-readable marker. The machine-readable marker is mounted on the bill, preferably on the rear side thereof. Such devices facilitate the performance of the above-mentioned method.

DETAILED DESCRIPTION OF THE PREFERRED EMBODIMENTS

Figure 1:
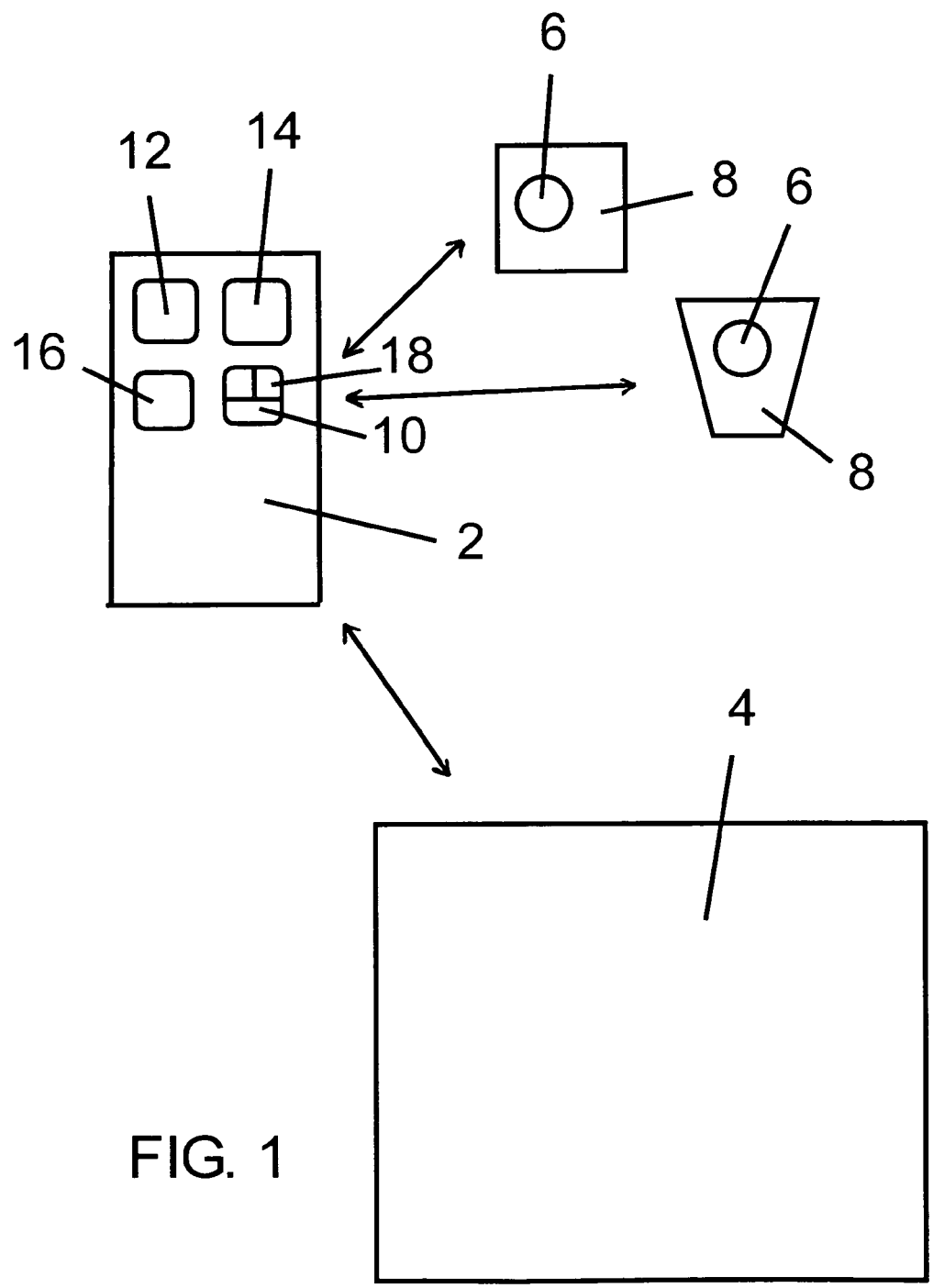
FIG. 1 shows an embodiment of a system according to the invention.

FIG. 1 shows an embodiment of a system for transferring an image from a mobile terminal to a server. The system includes at least one mobile terminal 2, at least one server 4, and at least two machine-readable markers 6 of different contents, which are mounted to or on articles 8. The at least one mobile terminal 2 is at least intermittently in contact with the at least one server 4 and communicates with the at least one server 4. The at least one mobile terminal 2 includes a reader 10 for reading machine-readable markers such as the machine-readable markers 6, includes a camera 12 for recording images, and includes means 14 for transferring images. The at least one mobile terminal 2 and the at least one server 4 are programmed to read at least one machine-readable marker such as machine-readable markers 6, to record at least one image, to transfer at least one recorded image from the at least one mobile terminal 2 to the at least one server 4, to transfer data from the at least one mobile terminal 2 to the at least one server 4, the data being associated with the data included in at least one machine-readable marker 6, and to generate via the data a comment linked to the at least one image transferred to the at least one server 4.

Data content of the at least two machine-readable markers 6 is associated with the articles 8. The reader 10 includes a decoder 18 for decoding information embedded in image data. The reader 10 also can have a receiver for electric, magnetic, and/or electromagnetic fields. The at least one mobile terminal 2 can also include a reader for contactless smart cards, NFC chips, or RFID labels. A sequence control 16 runs on the at least one mobile terminal 2 and is able to control or coordinate reading of markers and recording and transfer of images. FIG. 1 shows that this embodiment of the at least one mobile terminal 2 is a mobile telephone.

Figure 2:
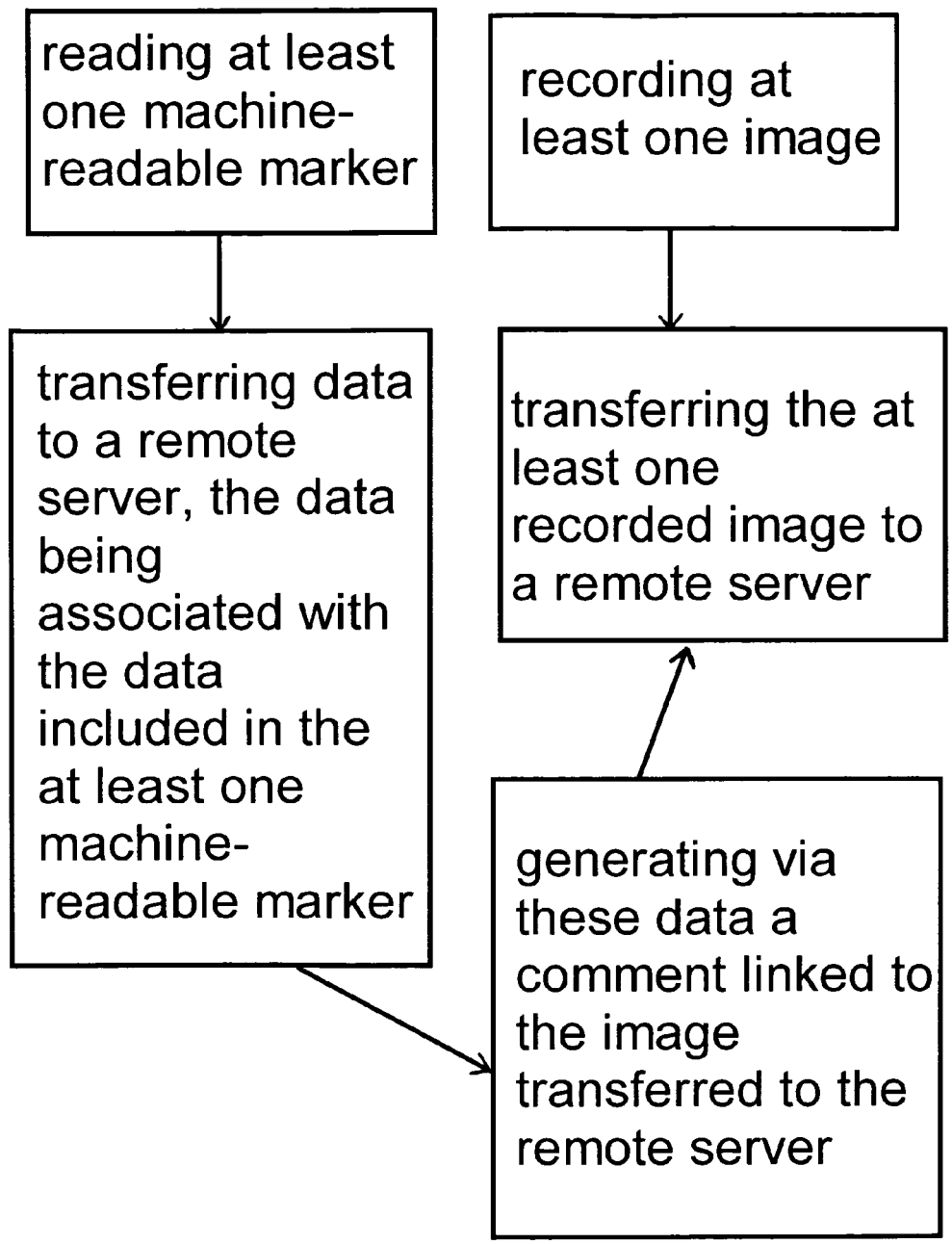
FIG. 2 shows a method according to the invention.

FIG. 2 shows a method according to the invention by which an image is transferred from a mobile terminal to a server. According to the method shown in FIG. 2, at least one machine-readable marker is read. At least one image is recorded. Data associated with the data included in the at least one machine-readable marker is transferred to a remote server. The at least one recorded image is transferred to a remote server. Via the data, a comment linked to the image transferred to the remote server is generated.

Figure 3:
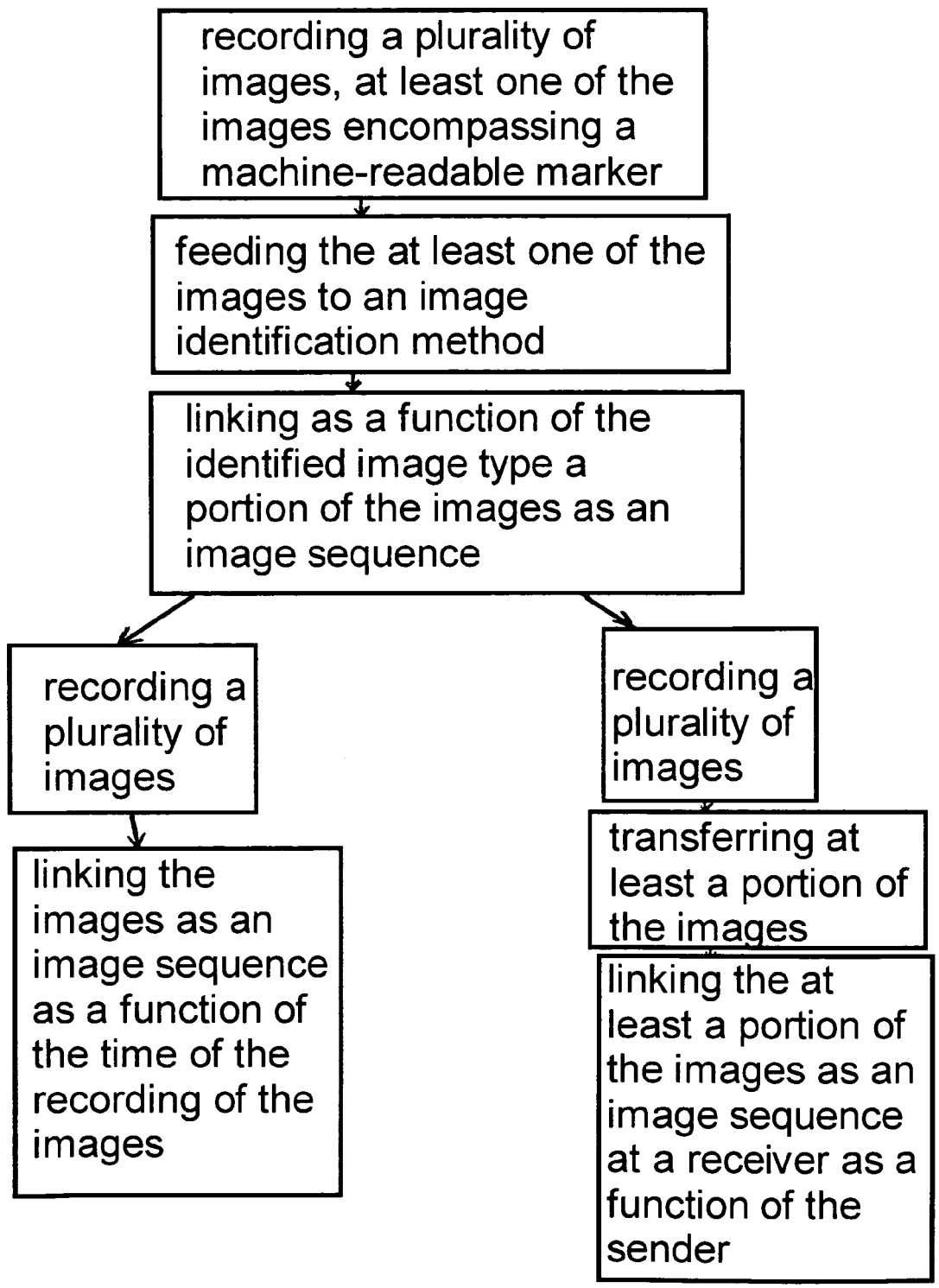
FIG. 3 shows another method according to the invention and shows various alternatives for optional performance therewith.

FIG. 3 shows another method according to the invention for transferring information, in particular of image data. According to the method shown in FIG. 3, a plurality of images is recorded. At least one of the images encompasses a machine-readable marker and is fed to an image identification method. A portion of the images is linked as an image sequence as a function of the identified image type.

FIG. 3 shows two sets of alternative steps that can be performed with the primary steps of the method shown in FIG. 3. FIG. 3 shows as one alternative thereof the further steps of recording a plurality of images and linking the images as an image sequence as a function of the time of the recording of the images. FIG. 3 shows as another alternative thereof the further steps of recording a plurality of images, transferring at least a portion of the images, and linking the at least a portion of the images as an image sequence at a receiver as a function of the sender.

Figure 4:
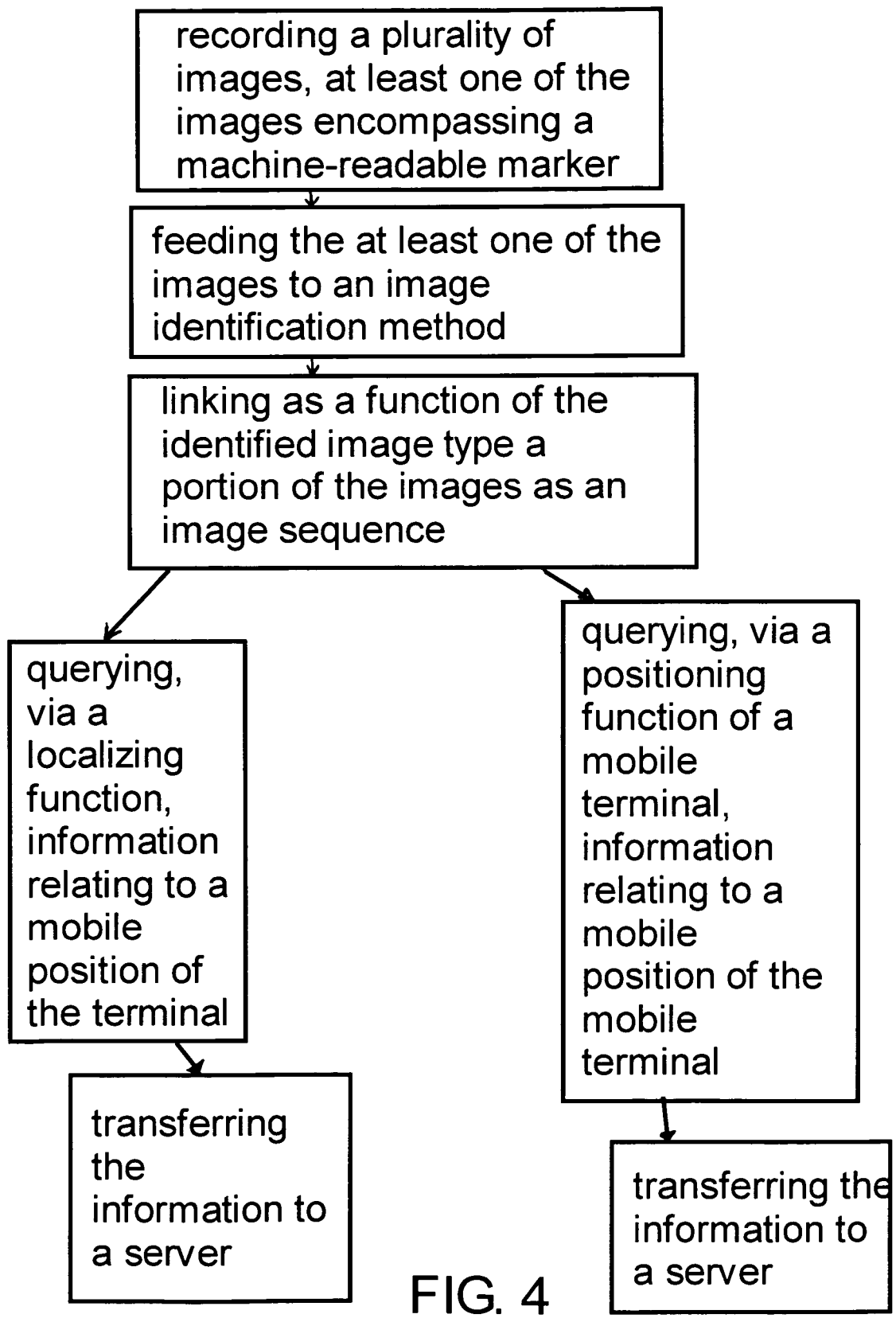
FIG. 4 shows the method of FIG. 3 with further various alternatives for optional performance therewith.

FIG. 4 shows the same primary steps that are shown in FIG. 3, but shows further sets of alternative steps that can be performed with the primary steps. FIG. 4 shows one set of these additional steps as including the steps of querying, via a localizing function, information relating to a mobile position of the terminal and transferring the information to a server. FIG. 4 shows as another set for alternative optional performance with the primary steps the steps of querying, via a positioning function of a mobile terminal, information relating to a mobile position of the mobile terminal and transferring the information to a server.

The invention claimed is:

1. A system for transferring an image from a mobile terminal to a server, said system comprising:
   at least one mobile terminal;
   at least one server;
   at least two machine-readable markers of different contents, which are mounted to or on articles;
   wherein the at least one mobile terminal is at least intermittently in contact with the at least one server and communicates with the at least one server;
   wherein the at least one mobile terminal comprises:
      a reader for reading machine-readable markers including reading of the at least two machine-readable markers;
      a camera for recording images; and
      means for transferring images; and wherein the at least one mobile terminal and the at least one server are programmed to:
- read at least one machine-readable marker;
- record at least one image;
- transfer said at least one recorded image from the at least one mobile terminal to the at least one server;
- transfer data from the at least one mobile terminal to the at least one server, said data being associated with the data included in said at least one machine-readable marker; and
- generate via said data a comment linked to said at least one image transferred to said at least one server.

2. The system according to claim 1, wherein data content of the at least two machine-readable markers is associated with the articles.

3. The system according to claim 1, wherein the reader encompasses a decoder for decoding information embedded in image data.

4. The system according to claim 1, wherein the reader encompasses a receiver for electric, magnetic and/or electromagnetic fields.

5. The system according to claim 1, wherein the at least one mobile terminal encompasses a reader for contactless smart-cards, NFC chips or RFID labels.

6. The system according to claim 1, further comprising a sequence control able to control or coordinate reading of markers and recording and transfer of images.

7. The system according to claim 6, wherein the sequence control runs on the at least one mobile terminal.

8. The system according to claim 1, wherein the at least one mobile terminal is a mobile telephone.

9. A method for transferring an image from a mobile terminal to a server, wherein at least one machine-readable marker is read, at least one image is recorded, said at least one recorded image is transferred to a remote server, data are transferred to a remote server, said data being associated with the data included in the at least one machine-readable marker, wherein a comment linked to the image transferred to the remote server is generated via these data.

10. The method according to claim 9, wherein the image and the data are wirelessly transferred to the server.

11. The method according to claim 9, wherein the data transferred to the remote server include at least a portion of the data included in the at least one machine-readable marker.

12. A method for transferring information, in particular of image data, wherein a plurality of images is recorded, wherein at least one of the images encompasses a machine-readable marker and is fed to an image identification method, and wherein a portion of the images is linked as an image sequence as a function of the identified image type, wherein at least one recorded image is transferred from at least one mobile terminal to at least one server; wherein data is transferred from the at least one mobile terminal to the at least one server, said data being associated with the data included in said at least one machine-readable marker, and wherein
- a comment is generated via said data linked to said at least one image transferred to said at least one server.

13. The method according to claim 12 wherein a plurality of images is recorded and is linked as an image sequence as a function of the time of the recording of said images.

14. The method according to claim 12 wherein a plurality of images is recorded, and wherein at least a portion of the images is transferred and is linked as an image sequence at a receiver as a function of a sender.

15. The method according to claim 12, wherein information relating to a position of a mobile terminal are queried via a localizing function of a network operator and are transferred to a server.

16. The method according to claim 12, wherein information relating to a position of a mobile terminal are queried via a positioning function of the mobile terminal and are transferred to a server.

* * * * *